Patented Mar. 4, 1952

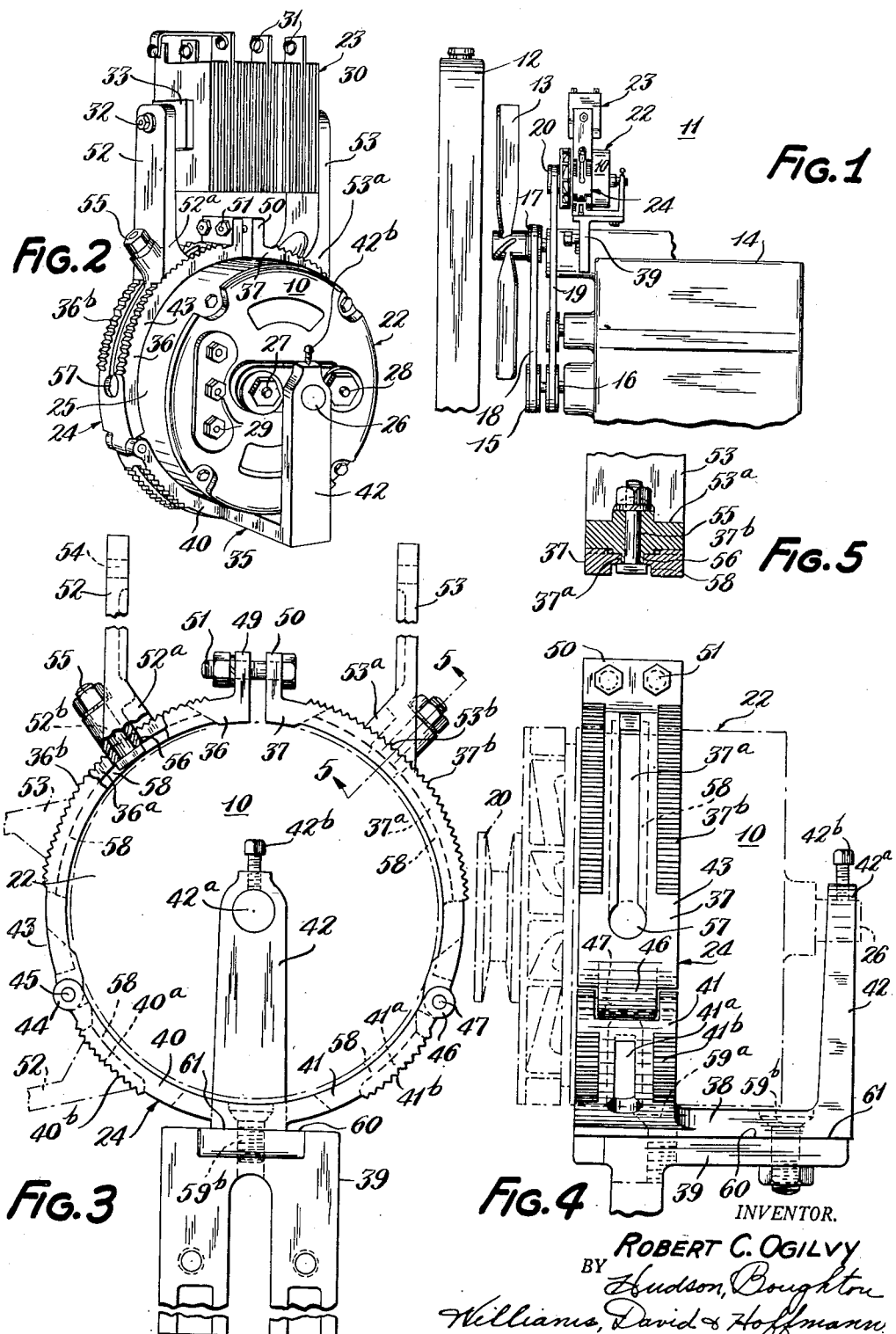

2,588,156

UNITED STATES PATENT OFFICE 2,588,156

ALTERNATOR AND RECTIFIER MOUNTING

Robert C. Ogilvy, Cleveland, Ohio, assignor to The Leece-Neville Company, Cleveland, Ohio, a corporation of Ohio Application June 16, 1950, Serial No. 168,549

10 Claims. (Cl. 171—252)

This invention relates to mounting devices and, more particularly, to an improved construction for an alternator-rectifier mounting means.

As one of its objects this invention provides an improved device for mounting an alternator, or an alternator-rectifier unit, on a motor vehicle and which is of a simple and economical construction adapted to be easily assembled and installed and which will be adjustable for positioning the rectifier to best advantage in the air stream of the engine cooling system of the vehicle, as well as for belt tightening purposes and for avoiding vibration interference with adjacent vehicle parts which might cause short circuiting of, or damage to the rectifier.

Another object is to provide an improved mounting device of this character which comprises flexibly connected rigid arcuate members forming a band means adapted to receive the alternator and clampingly embrace the frame thereof.

A further object is to provide an improved mounting device of the character mentioned in which the flexibly connected rigid arcuate members forming the band means include a pair of oppositely extending arms of a bracket member and in which such bracket member carries a post adapted to supportingly engage an axial shaft projection of the alternator.

Still another object is to provide an improved alternator-rectifier mounting means in which flexibly connected rigid arcuate members form a band means adapted to receive and clampingly embrace the alternator and carrier arm means projecting outwardly from such band means forms a support for the rectifier.

Yet another object is to provide improved alternator-rectifier mounting means of the type referred to in which the rigid arcuate members of the band means have teeth or serrations thereon disposed in peripherally extending rows and the carrier arm means for the rectifier also has teeth or serrations thereon engageable with different selected portions of the tooth rows of the band means for adjustably holding the carrier arm means in a desired location.

As another object, this invention provides improved alternator-rectifier mounting means of this character in which the rigid arcuate members carrying the rows of serrations also have slots therein adjacent the rows of serrations and extending peripherally of the band means, and in which the serrations of the carrier arms for the rectifier are adapted to be releasably held in meshing engagement with the serrations of the band means by clamping members extending through the slots of the band means.

It is also an object of this invention to provide improved alternator-rectifier apparatus in which an alternator and a rectifier are mounted on a motor vehicle in such relation to the radiator and cooling fan thereof that these electrical devices, and particularly the rectifier, will be traversed and cooled by the stream of cooling air.

The invention can be further briefly described as consisting in certain novel combinations and arrangements of parts hereinafter described and particularly set out in the claims hereof.

In the accompanying sheet of drawings,

Fig. 1 is a partial side elevation of a motor vehicle having the improved alternator-rectifier apparatus of this invention applied thereto;

Fig. 2 is a perspective view showing the improved alternator-rectifier apparatus in detached relation;

Fig. 3 is a front elevation of the alternator-rectifier mounting means;

Fig. 4 is a side elevation thereof but with the carrier arms for the rectifier omitted; and Fig. 5 is a transverse sectional detail view taken through the band means on line 5—5 of Fig. 3.

By the use of the improved mounting means provided by this invention an alternator-rectifier unit 10 is adapted to be mounted on a motor vehicle 11 in such relation to the radiator 12 and cooling fan 13 of the vehicle that this unit will be traversed by the stream of cooling air. Provision for mounting such an alternator-rectifier unit in this relative location is important in a vehicle electrical system embodying such a unit, because it will provide for an adequate cooling of the rectifier for a safe and efficient functioning of the electrical system.

The vehicle 11 includes a conventional internal combustion driving engine 14 which is located rearwardly of the radiator 12 and cooling fan 13 and has a pair of pulleys 15 and 16 mounted on the forward end of its crankshaft and forming an auxiliary power take-off means. The fan 13 has a pulley 17 connected therewith and is adapted to be driven from the pulley 15 by a belt 18. A second belt 19 extends around the pulley 16 and a pulley 20 of the alternator-rectifier unit 10 for driving the alternator of this unit.

The alternator-rectifier unit 10 comprises an alternator 22, a rectifier 23 and a mounting device 24 which supports these devices and holds them in a mechanically connected relation to form this unit. The alternator 22 may be an inductor type of alternator having a stator which includes an annular frame 25. The alternator 22 is here shown as also having a substantially central rearwardly extending axial shaft projection 26 and a pair of field winding terminals 27 and 28 located on opposite sides of such shaft projection. The rear end of the alternator 22 also carries a group of load terminals 29, three of which are shown in this instance since the alternator is a three-phase alternator.

The alternator 22 is more fully disclosed, and is claimed, in copending patent application Serial No. 186,400, filed September 23, 1950.

The rectifier 23 is of a conventional construction and is here shown as being of the type comprising a group or pack of plates 30 and having appropriate terminals 31 for connection with the terminals 29 of the alternator and with the load circuit of the electrical system of the vehicle. The rectifier 23 can be further described as being a three-phase full-wave rectifier of the dry-plate type. The plate-pack of this rectifier is provided at opposite ends thereof with outwardly projecting mounting screws 32 which are suitably connected with the plate-pack by means of the electrically insulating blocks 33.

The mounting device 24 comprises a bracket member 35 and a pair of rigid arcuate band members 36 and 37 connected with such bracket member. The bracket member 35 includes a base portion 38 adapted for seating engagement with a support which is here represented by an adapter fitting or bracket 39. The bracket member 35 also includes a pair of rigid arcuate arms 40 and 41 extending outwardly and upwardly from opposite sides of the base portion 38. As shown in the drawing, the bracket member 35 additionally includes an upright integral post 42 at the rear end of the base portion 38 and adapted for supporting connection with the axial shaft projection 26 of the alternator 22. For this supporting connection the upper end of this post is provided with an opening 42a adapted to receive the shaft projection 26 and a set screw 42b for clamping engagement with this shaft projection.

The curved arms 40 and 41 of the bracket member 35 and the curved members 36 and 37 are connected together so as to form a band means 43 which will now be further described. The adjacent ends of the curved band member 36 and the curved arm 40 are provided with interfitting eye portions 44 which are connected by a pivot pin 45 so as to form a hinge joint between these members. Similarly, the adjacent ends of the curved band member 37 and the curved arm 41 are provided with interfitting eye portions 46 which are connected by a pivot pin 47 for forming a hinge connection between these members.

The annular band means 43 is adapted to receive the alternator 22 and to clampingly embrace the frame 25 thereof as shown in Fig. 2. The alternator is supported in the mounting device 24 by this clamping engagement of the band means around the frame 25 and by the engagement of the shaft projection 26 in the post 42. For producing the clamping engagement of the band means 43 with the alternator frame 25 the adjacent ends of the curved band members 36 and 37 are provided with substantially radially extending lugs 49 and 50 which are disposed in adjacently spaced relation and are adapted to be drawn toward each other by clamping bolts 51 extending therethrough.

The mounting device 24 also includes a pair of carrier arms 52 and 53 which extend outwardly from the band means 43 in spaced apart relation and form a carrier for the rectifier 23. These arms are provided with openings 54 adjacent their outer ends and when the rectifier is disposed between the arms, as shown in Fig. 2, the projecting screws 32 of the rectifier will extend through these openings for mounting the rectifier on the carrier arms.

As shown in the drawing, the carrier arms 52 and 53 have relatively enlarged base portions 52a and 53a which have seating engagement on the band means 43 and, in this instance, on the band members 36 and 37. For connecting the carrier arms 52 and 53 with the band means 43, the rigid curved members 36, 37, 40 and 41 thereof have T-slots 36a, 37a, 40a and 41a therein extending peripherally of the band means and the base portions 52a and 53a carry clamping bolts 55 for engagement in these T-slots. The base portions 52a and 53a are also provided with tongues 56 on the bottom thereof which engage in the T-slots. Each of the T-slots is provided at one end thereof with an enlarged opening 57 through which the head of one of the clamping bolts 55 can be passed. The curved members 36, 37, 40 and 41 also have peripheral grooves 58 in the underside thereof which are coextensive with the slots 36a, 37a, 40a and 41a and which grooves receive the heads of the clamping bolts 55 and hold the same against turning (see Fig. 5).

The T-slots of the band means 43 permit shifting of the carrier arms 52 and 53 peripherally of the band means to different positions of adjustment which may be desirable for locating the rectifier 23 to best advantage in the air stream of the engine cooling system and for avoiding vibration interference between the rectifier and adjacent vehicle parts which might otherwise cause short circuiting or damage to the rectifier. Figs. 2 and 3 show the carrier arms 52 and 53 mounted on the band members 36 and 37 at such points of the band means that these carrier arms extend in a substantially vertical parallel relation for locating the rectifier 23 at the rear of the cooling fan 13, as shown in Fig. 1.

The carrier arms 52 and 53 can be shifted arcuately along the band members 36 and 37 for locating the rectifier 23 on one side or the other of the vertical center line or, if desired, the carrier arms 52 and 53 can be shifted to the broken line position shown in Fig. 3 in which the carrier arm 52 is mounted on the curved arm 40 of the bracket member 35 and the carrier arm 53 is mounted on the band member 36. With these carrier arms mounted in this location the rectifier will be supported in a position extending downwardly and laterally to the left of the alternator, as seen in Fig. 3. Similarly, by shifting the carrier arms 52 and 53 to the right-hand side of the band means, the rectifier can be supported in a position extending downwardly and laterally to the right of the alternator.

For maintaining the carrier arms 52 and 53 in the desired position of adjustment and to provide for small accurate increments of adjustment of these arms at the different selected positions thereof, the band members 36, 37, 40 and 41 are provided with peripherally extending rows of teeth or serrations 36b, 37b, 40b and 41b and the base portions 52a and 53a of the carrier arms are provided with peripherally extending rows of similar teeth or serrations 52b and 53b. In this instance each band member is provided with two rows of such perforations located on opposite sides of the peripherally extending slot thereof. The base portions of the carrier arms 52 and 53 likewise have two rows of such serrations located on opposite sides of the clamping bolt 55 and the locating tongue 56.

When the carrier arms 52 and 53 have been shifted peripherally of the band means to the location corresponding with the position to be occupied by the rectifier 23 the clamping bolts 55 are tightened, thereby causing the serrations of the base portions 52a and 53a to be drawn into meshing engagement with the serrations of the band means. The meshing engagement of these serrations of the carrier arms and band means will effectively hold the carrier arms against accidental shifting and the rectifier will thus be securely maintained in the desired position.

When the support for the alternator-rectifier unit 10 is formed by an adapter bracket, such as the adapter bracket 39 shown in this instance, the bracket member 35 of the mounting device 24 can be connected with this adapter bracket by means of the screws 59a and 59b. As shown in the drawing, the adapter bracket 39 is provided with a flat top surface 60 against which the flat lower surface 61 of the bracket member 35 is clampingly held by these screws. The adapter bracket 39 can be suitably attached to the vehicle engine 14 so as to permit a vertical sliding or shifting of this bracket relative to the engine for tightening the belt 19.

Instead of the vertically slidable adaper bracket 39 shown in this instance, various other appropriate forms of adapter brackets can be used which will be appropriate for the different makes of vehicles to which the alternator-rectifier unit is to be applied and, in some instances, an adapter bracket may be used which is pivotally connected with the vehicle engine so as to provide for tightening of the belt 19 by a swinging of the alternator-rectifier unit 10.

From the foregoing description and the accompanying drawing it will now be readily understood that this invention provides novel mounting means for an alternator-rectifier unit by which such a unit can be located to best advantage with respect to the stream of cooling air produced by the engine cooling fan or by the forward movement of the vehicle and which will also provide for adjustment or variation in the positioning of the alternator-rectifier unit to cause tightening of the alternator belt and to prevent vibration interference between the rectifier and adjacent portions of the vehicle structure. It will now also be understood that the improved mounting means provided by this invention supports the alternator and rectifier in an adjacent connected relation so as to constitute a single unit and to facilitate the mounting thereof on the vehicle structure such as on the driving engine. Additionally, it will be seen that the novel mounting means of this invention provides flexible band means adapted to clampingly embrace the frame of the alternator and includes carrier arm means projecting from such band means for mounting a plate-pack type of rectifier thereon and in which the carrier arm means is adjustably shiftable peripherally of the band means and is adapted to be clamped in the position of adjustment selected to best suit the rectifier. Furthermore, it will now also be understood that the band means and the carrier arm means are provided with cooperating serrations by which the carrier arm means will be securely held in the selected position of adjustment and by which small accurate increments of adjustment can be easily obtained for a satisfactory positioning of the rectifier.

Although the alternator-rectifier mounting means of this invention has been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. In alternator-rectifier apparatus, a mounting device comprising bracket means engageable with a support, band means connected with said bracket means and adapted to extend in embracing relation around an alternator for supporting said alternator, and a pair of arms carried by said band means and projecting outwardly therefrom in spaced apart relation and adapted for the mounting of a rectifier therebetween.

2. In alternator-rectifier apparatus, a mounting device comprising bracket means engageable with a support, an annular group of connected arcuate rigid members carried by said bracket means and defining band means adapted to extend in embracing relation around an alternator for supporting said alternator, and a pair of rigid arm members carried by said band means and projecting outwardly therefrom in spaced apart relation and adapted for the mounting of a rectifier of the plate-pack type therebetween.

3. In alternator-rectifier apparatus, a mounting device comprising bracket means engageable with a support, band means connected with said bracket means and adapted to extend in encircling relation about an alternator and to be clamped thereto for supporting said alternator, a peripherally extending series of teeth on said band means, arm means projecting outwardly from said band means and adapted for the mounting of a plate-pack type of rectifier thereon, said arm means being enlarged at the base thereof for seating engagement on said band means and provided with teeth for meshing engagement with teeth of said band means, and clamping means connecting said arm means with said band means and holding the teeth of said arm means in mesh with the engaged teeth of said band means.

4. In alternator-rectifier apparatus, a mounting device comprising bracket means engageable with a support, an annular group of connected arcuate rigid members carried by said bracket means and defining band means adapted to extend in embracing relation around an alternator for supporting said alternator, a pair of rigid arm members projecting outwardly from said band means in spaced apart relation and adapted for the mounting of a rectifier of the plate-pack type therebetween, cooperating portions of said arcuate members and said arm members having serrations thereon for meshing engagement for holding said arm members at a desired location on the periphery of said band means and the serrations of said arcuate members extending for a substantial distance along the periphery of said band means to accommodate different settings of said arm members, and means for clampingly connecting said arm members with said band means for retaining the serrations thereof in meshing engagement.

5. In alternator-rectifier apparatus, a mounting device comprising bracket means engageable with a support, an annular group of arcuate rigid members including portions of said bracket means, means pivotally connecting said members in end-to-end relation to define band means carried by said bracket means and adapted to extend around an alternator and to be clamped thereto for supporting said alternator, said members having slots therein extending peripherally of said band means and rows of teeth adjacent said slots and also extending peripherally of said band means, a pair of arms projecting outwardly relative to said band means and adapted for the mounting of a rectifier therebetween, said arms having base portions provided with teeth adapted for meshing engagement with teeth of said band means at different desired locations peripherally of said band means, and clamping members connecting said base portions with said band means by extending through said slots and also holding the teeth of said arms in mesh with the engaged teeth of said band means.

6. In a mounting device for an alternator or the like having an annular frame, a bracket member adapted to be connected with a support and having a pair of oppositely extending curved arms, a pair of curved band members having the remote ends thereof flexibly connected with said curved arms and cooperating therewith to define band means adapted to receive said frame, and clamping means cooperating with the adjacent ends of said curved band members for causing said band means to embracingly grip said frame for supporting said alternator.

7. In a mounting device for an alternator or the like having an annular frame and an axial shaft projection, a bracket member adapted to be connected with a support and having an upright post and a pair of oppositely projecting outwardly and upwardly curved arms, said post having means for supporting engagement with said shaft projection, a pair of curved band members having the remote ends thereof flexibly connected with said curved arms and cooperating therewith to define band means adapted to receive said frame, and contracting means cooperating with the adjacent ends of said curved band members for causing said band means to embracingly grip said frame.

8. In a mounting device for an alternator or the like having an annular frame, a bracket member adapted to be connected with a support and having a pair of oppositely extending curved arms, a pair of curved band members having the remote ends thereof flexibly connected with said curved arms and cooperating therewith to define band means adapted to receive said frame, clamping means cooperating with the adjacent ends of said curved band members for causing said band means to embracingly grip said frame for supporting said alternator, said curved arms and band members having teeth thereon disposed in rows extending peripherally of said band means, a pair of carrier arms extending outwardly relative to said band means and adapted for mounting a rectifier therebetween, said carrier arms having base portions seating on said band means and provided with teeth having meshing engagement with teeth of said band means, and clamping means connecting said base portions with said band means and maintaining the engaged teeth in meshing relation.

9. In a mounting device for an alternator or the like having an annular frame, a bracket member adapted to be connected with a support and having a pair of oppositely extending curved arms, a pair of curved band members having the remote ends thereof flexibly connected with said curved arms and cooperating therewith to define band means adapted to receive said frame, clamping means cooperating with the adjacent ends of said curved band members for causing said band means to embracingly grip said frame for supporting said alternator, said curved arms and band members having slots therein extending peripherally of said band means and rows of teeth adjacent said slots and also extending peripherally of said band means, a pair of carrier arms extending outwardly relative to said band means and adapted for mounting a rectifier therebetween, said carrier arms having base portions seating on said band means and provided with teeth having meshing engagement with teeth of said band means, and clamping members connecting said base portions with said band means by extending through said slots and also maintaining the engaged teeth in meshing relation.

10. In a mounting device for an alternator or the like having an annular frame and an axial shaft projection, a bracket member adapted to be connected with a support and having an upright post and a pair of oppositely projecting outwardly and upwardly curved arms, said post having means for supporting engagement with said shaft projection, a pair of curved band members having the remote ends thereof flexibly connected with said curved arms and cooperating therewith to define band means adapted to receive said frame, and contracting means cooperating with the adjacent ends of said curved band members for causing said band means to embracingly grip said frame, said curved arms and band members having slots therein extending peripherally of said band means and rows of teeth adjacent said slots and also extending peripherally of said band means, a pair of carrier arms extending outwardly relative to said band means and adapted for mounting a rectifier therebetween, said carrier arms having base portions seating on said band means and provided with teeth having meshing engagement with teeth of said band means, and clamping members carried by said base portions and engaging said band means through said slots for connecting said carrier arms with said band means at desired locations peripherally thereof and also maintaining the engaged teeth in meshing relation.

ROBERT C. OGILVY.

REFERENCES CITED

The following references are of record in the file of this patent:

UNITED STATES PATENTS

| Number | Name | Date |
|---|---|---|
| 1,236,568 | Johnson | Aug. 14, 1917 |
| 1,297,003 | Parsons | Mar. 11, 1919 |
| 1,898,728 | Huff | Feb. 11, 1933 |
| 2,217,471 | Conrad | Oct. 8, 1940 |